Feb. 8, 1938.  H. H. GRECE  2,107,567
WINDSHIELD WIPER BLADE
Filed Aug. 12, 1936
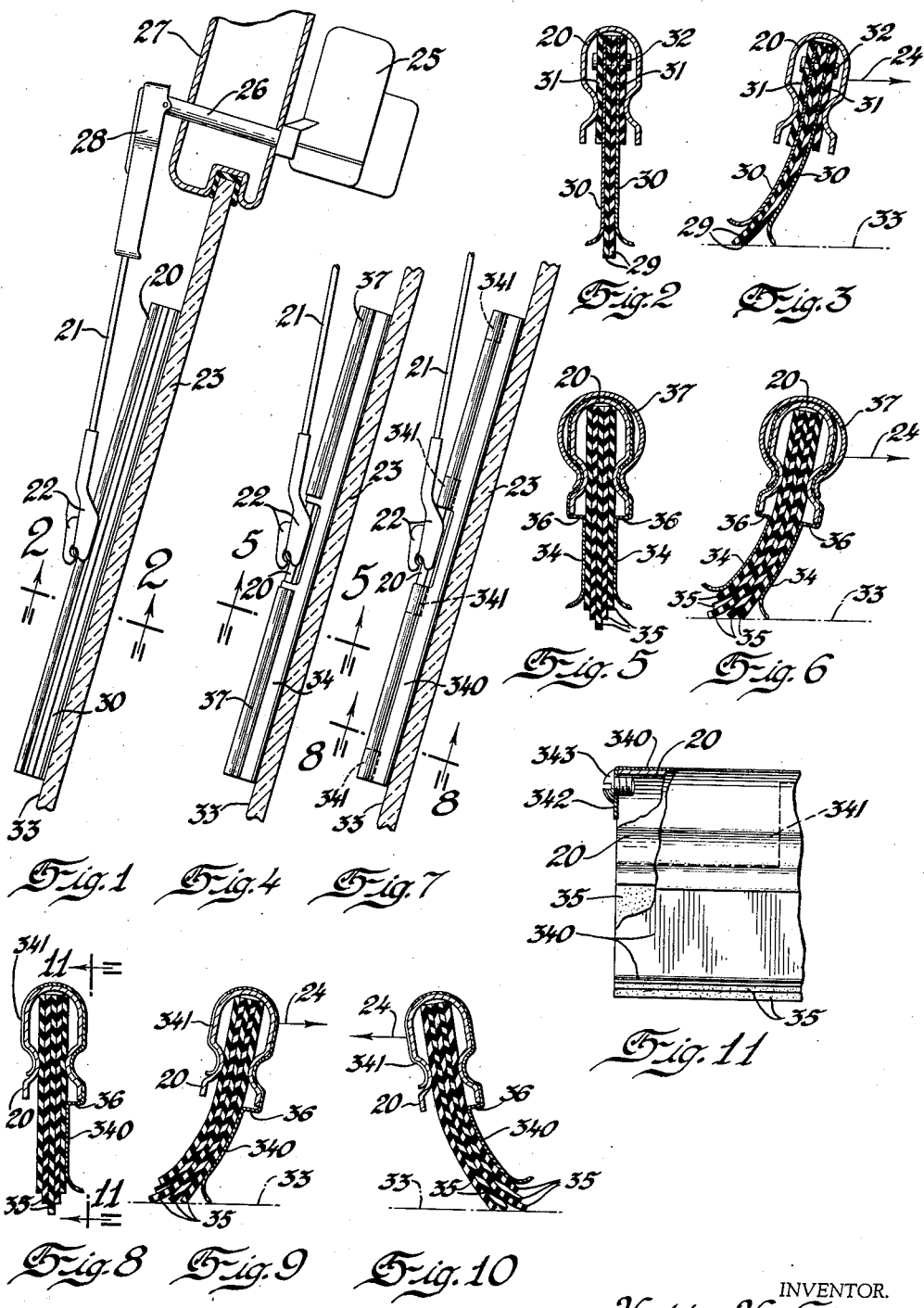
INVENTOR.
Harry H. Grece
BY Everett H. Wright
ATTORNEY.

Patented Feb. 8, 1938

2,107,567

UNITED STATES PATENT OFFICE 2,107,567

WINDSHIELD WIPER BLADE

Harry H. Grece, Detroit, Mich.

Application August 12, 1936, Serial No. 95,581

8 Claims. (Cl. 15—250)

This invention relates to windshield wiper blades and in particular to means for use in combination with the usual windshield wiper blade for removing snow, ice and sleet from windshields of automobiles and the like.

The usual windshield wiper blade comprises one or more plies of flexible composition rubber or the like retained in a metal back and adapted to be wiped or drawn across the outside surface of a glass windshield with the lower edges of the said plies of rubber in contact with the said surface of the windshield.

When ice, snow and sleet form on the windshield the wiper blade generally wipes over the deposits formed on the said windshield with little or no effect. Some attempts have been made to provide means for mechanically removing snow, sleet and ice from windshields by various types of windshield wiper blades but all have been too expensive, difficult to operate because of being extremely heavy, of such proportions as to materially decrease visibility and not adaptable for use on the present usual type of windshield wiper furnished on automobiles.

With the foregoing in view, one object of this invention is to provide, in combination with the usual windshield wiper blade, mechanical means for removing snow, ice and sleet from windshields wiped thereby.

Another object of this invention is to provide means attachable to the standard back of a windshield wiper for mechanically removing snow, ice and sleet from the windshield.

Another object of this invention is to provide means attachable to and detachable from the standard back of a windshield wiper for scraping snow, ice and sleet from a windshield which will accommodate itself to irregularities in the surface of the windshield scraped thereby.

Another object of this invention is to provide means in combination with a windshield wiper adapted to flex with the wiper blade for scraping snow, ice and sleet from a windshield and at the same time permit the one or more ply flexible rubber wiper blade to wipe the said windshield in the normal manner.

Another object of this invention is to provide removable means adapted to be secured in operating relationship to a standard back of a windshield wiper blade for scraping snow, ice and sleet from a windshield simultaneous with wiping the said windshield with the usual flexible rubber windshield wiper blade.

Other objects of this invention will become apparent by reference to the following detailed description taken in connection with the accompanying drawing, in which:

Fig. 1 is a vertical sectional view showing a windshield and windshield header construction of an automobile including a windshield wiper motor, wiper arm, and a windshield wiper blade embodying this invention mounted on the end of the said wiper arm in the usual manner.

Fig. 2 is an enlarged detailed cross sectional view of the embodiment of the invention shown in Fig. 1 taken on the line 2—2 thereof.

Fig. 3 is an enlarged detailed cross sectional view of the embodiment of the invention disclosed in Figs. 1 and 2 showing the windshield wiper in the position it takes when being drawn across the windshield in the direction indicated by the arrow.

Fig. 4 is a fragmentary vertical sectional view similar to Fig. 1 of another embodiment of the invention comprising a usual type of windshield wiper blade with novel flexible scraping means spring clipped thereto.

Fig. 5 is an enlarged detailed cross sectional view taken on the line 5—5 of Fig. 4.

Fig. 6 is an enlarged detailed cross sectional view of the embodiment of the invention disclosed in Figs. 4 and 5 showing the windshield wiper in the position it takes when being drawn across the windshield in the direction indicated by the arrow.

Fig. 7 is a fragmentary vertical sectional view similar to Figs. 1 and 4 of still another embodiment of the invention comprising a usual type of windshield wiper blade with novel flexible scraping means secured thereto by means of suitable spring tabs integral with said scraping means.

Fig. 8 is an enlarged detailed cross sectional view taken on the line 8—8 of Fig. 7.

Figs. 9 and 10 are enlarged detailed cross sectional views of the embodiment of the invention disclosed in Figs. 7 and 8 showing the windshield wiper in the positions it takes when being drawn across the windshield in the direction indicated by the arrows.

Fig. 11 is an enlarged fragmentary elevational view taken on the line 11—11 of Fig. 8 with portions thereof broken away to illustrate means for preventing the scraping element from sliding longitudinally in respect to the windshield wiper blade upon which it is secured.

Referring now to the drawing wherein like numerals refer to like and corresponding parts throughout the several views, the embodiments of the windshield wiper blades shown in the drawing are each disclosed in combination with a standard type blade back or holder 20 which is connected to a windshield wiper arm 21 by suitable connecting means 22. The said connecting means 22 is of the usual type adapted to provide sufficient play between the wiper blade and the wiper arm 21 to permit the said wiper blade to trail the back 20 thereof when being moved arcuately across the windshield 23 in either direction as indicated by the arrows 24 in Figs. 3, 6, 9 and 10.

A reversible motor 25 is supported within the vehicle body preferably above the windshield 23 with the shaft 26 thereof extending through the windshield header construction 27. The windshield wiper arm 21 is connected on the protruding end of the motor shaft 26 by a spring pivot means 28 which constantly urges the depending end of the wiper arm 21 toward the windshield 23 with sufficient force to assure a positive contact between the wiper blade carried thereby and the windshield 23.

Referring now particularly to the embodiment of the invention shown in Figs. 1, 2 and 3, the improved windshield wiper blade comprises one or more centrally disposed plies of flexible rubber wiping strips 29 having one thin flexible metal scraper strip 30 on each side thereof. The upper portion of the said wiper blade is provided with filler strips 31 on the outside of said scraper strips 30 to permit the windshield wiper blade assembly to be frictionally retained on the standard type windshield wiper blade back or holder 20. The entire assembly of wiping strips 29, scraper strips 30 and filler strips 31 is secured together into a unitary wiper blade by such means as the rivets 32 located at intervals along the said wiper blade near the top thereof, see Figs. 2 and 3.

The thin flexible scraper strips 30 are preferably formed of very thin strip steel with the bottom edges thereof rolled arcuately outward in respect to the central vertical axis of the wiper blade of which they are a part and are tempered to permit flexing with the wiping strips 29 when drawn across the surface 33 of a windshield 23 under pressure of the spring pivot means 28, the said windshield surface 33 being indicated in Figs. 3, 6, 9 and 10 by dot and dash lines 33 therein.

Fig. 3 illustrates the flexing of the windshield wiper blade assembly under operating conditions with the wiper blade trailing the back 20 thereof when being drawn across the windshield surface 33 in the direction indicated by the arrow 24. It will be observed that the outwardly disposed preferably sharpened lower edge of the leading scraper strip 30 scrapes the surface 33 of the windshield 23 for removing snow, ice, sleet and the like therefrom and that the wiping strips 29 following the said scraper strip 30 wipe the said windshield surface clean after the said scraping thereof. With the deposits of snow, ice and sleet removed by the scraper strips 30, heat from within the automobile body conducted through the windshield 23 will keep moisture on the surface 33 thereof below freezing point in most instances thereby permitting the wiping strips 29 to function more effectively in cold weather.

Referring now to Figs. 4, 5 and 6, the embodiment of the present invention shown therein comprises thin flexible metal scraper strips 34 shaped to fit on each side of the standard type windshield wiper back or holder 20 having a plurality of flexible rubber wiping strips 35 retained therein. The said scraper strips 34 are preferably shouldered at 36 to permit the lower portion of the said scraper strips 34 to be juxtaposed in relation to the depending portion of the wiping strips 35. The said scraper strips 34 are removably secured to the standard windshield wiper back 20 by such suitable means as the spring clips 37. One scraper strip 34 may be used instead of two if desired.

The thin flexible scraper strips 34 are preferably formed of very thin strip steel with the bottom edges thereof rolled arcuately outward in respect to the central vertical axis of the wiper blade to which they are clipped and are tempered to permit flexing with the wiping strips 35 when drawn across the surface 33 of a windshield 23 under pressure of the spring pivot means 28. Fig. 6 illustrates the flexing of a standard windshield wiper blade having flexible scraper strips 34 suitably removably secured thereon with one of the scraper strips 34 scraping the windshield surface 33 and the wiping strips 35 wiping the said windshield surface 33 after it is scraped by the said scraper strip 34 when being drawn across the said windshield surface 33 in the direction indicated by the arrow 24 with the said scraper strips 34 and wiping strips 35 trailing the said standard windshield wiper back or holder 20.

The embodiment of the invention shown in Figs. 7, 8, 9 and 10 is similar in every respect to the embodiment of the invention shown in Figs. 4, 5 and 6 except that only one scraper strip 340 is used with the standard type windshield wiper blade composed of wiping strips 35 and a back or holder 20, and that the scraper strip 340 is secured to the said back or holder 20 by such suitable means as spring tabs 341 integral with the said scraper strip 340. Two scraper strips 340 may be used instead of one if desired.

It will be noted that the lower portion of the flexible scraper strips 30, 34, and 340 are preferably of such thinness and temper as to permit them to flex with and remain juxtaposed to the wiping strips 29, 35 and 35 respectively when under operating pressure of the spring pivot means 28, see Figs. 3, 6, 9 and 10. Thus, the scraper strips as well as the wiping strips will conform to the irregularities in the surface of the windshield scraped thereby.

The scraper strips 340 may be provided with end tabs 342, see Fig. 11, bent normal thereto through which suitable screws 343 are threaded. The end of the said screws 343 extend into the ends of the standard windshield wiper back or holder 20 and prevent ends of the scraper strip or strips 340 from coming off the said wiper back or holder 20, under extreme conditions. The said end tabs 342 prevent the said scraper strip or strips 340 from sliding longitudinally in respect to the said windshield wiper back or holder 20.

Although but three specific embodiments of the invention have been disclosed and described herein, it will be understood that various changes including the size, shape, arrangement and details of the various parts thereof may be made without departing from the spirit of the invention, and it is not intended to limit the scope of the invention other than by the terms of the appended claims.

I claim:

1.- In combination with a windshield wiper blade composed of a holder and a plurality of resilient composition wiping strips held within said holder and depending therefrom, a tempered flexible thin metal scraper strip having its lower edge bent outward with respect to said wiping strips juxtaposed to said wiping strips and adapted to flex with the said wiping strips under usual operating pressure for permitting the said scraper strip as well as the said wiping strips to conform to any irregularities in the surface of a windshield scraped and wiped thereby.

2. In combination with a windshield wiper blade composed of a holder and a plurality of resilient composition wiping strips held within said holder and depending therefrom, a tempered flexible thin metal scraper strip having its lower edge rolled arcuately outward with respect to said wiping strips removably secured to said holder with the lower portion of said scraper strip juxtaposed to said wiping strips and adapted to flex with the said wiping strips under usual operating pressure for permitting the said scraper strip as well as the said wiping strips to conform to any irregularities in the surface of a windshield scraped and wiped thereby.

3. In combination with a windshield wiper blade composed of a holder and a plurality of resilient composition wiping strips held within said holder and depending therefrom, tempered flexible thin metal scraper strips having their lower edge rolled arcuately outward with respect to said wiping strips juxtaposed on each side of said wiping strips and adapted to flex with the said wiping strips under usual operating pressure for permitting the said scraper strips as well as the said wiping strips to conform to any irregularities in the surface of a windshield scraped and wiped thereby.

4. In combination with a windshield wiper blade composed of a holder and a plurality of resilient composition wiping strips held within said holder and depending therefrom, tempered flexible thin metal scraper strips having their lower edge rolled arcuately outward with respect to said wiping strips removably secured to said holder with the lower portion of said scraper strip juxtaposed on each side of said wiping strips and adapted to flex with the said wiping strips under usual operating pressure for permitting the said scraper strips as well as the said wiping strips to conform to any irregularities in the surface of a windshield scraped and wiped thereby.

5. In combination with a windshield wiper blade composed of a holder and a plurality of flexible resilient wiping strips frictionally held within said holder and centrally depending therefrom, flexible metal scraper strips formed to register with the configuration of the said holder and shouldered at the bottom of said holder to permit the lower portion of said scraper strips to be juxtaposed to said wiping strips, the lower edge of said flexible metal scraper strips being rolled arcuately outward with respect to said wiping strips, and means for removably securing said scraper strips to said holder.

6. In combination with a windshield wiper blade composed of a holder and a plurality of flexible resilient wiping strips frictionally held within said holder and centrally depending therefrom, flexible metal scraper strips formed to register with the configuration of the said holder and shouldered at the bottom of said holder to permit the lower portion of said scraper strips to be juxtaposed to said wiping strips, the lower edge of said flexible metal scraper strips being rolled arcuately outward with respect to said wiping strips, and spring means for removably securing said scraper strips to said holder.

7. In combination with a windshield wiper blade composed of a holder and a plurality of flexible resilient wiping strips frictionally held within said holder and centrally depending therefrom, a flexible metal scraper strip formed to register with the configuration of the said holder and shouldered at the bottom of said holder to permit the lower portion of said scraper strip to be juxtaposed to said wiping strips, means integral with said scraper strip adapted to removably secure said scraper strip to said holder, the lower edge of said flexible metal scraper strip being rolled arcuately outward with respect to said wiping strips.

8. In combination with a windshield wiper blade composed of a holder and a plurality of flexible resilient wiping strips frictionally held within said holder and centrally depending therefrom, a flexible metal scraper strip formed to register with the configuration of the said holder and shouldered at the bottom of said holder to permit the lower portion of said scraper strip to be juxtaposed to said wiping strips, spring tabs formed integral with said scraper strip adapted to removably secure said scraper strip to said holder, the lower edge of said flexible metal scraper strip being rolled arcuately outward with respect to said wiping strips.

HARRY H. GRECE.